United States Patent [19]
Keller

[11] Patent Number: 5,897,787
[45] Date of Patent: Apr. 27, 1999

[54] STRAINER AND METHOD FOR SEPARATING SOLID PARTICLES FROM A LIQUID

[75] Inventor: Timothy Robert Keller, Salisbury, Md.

[73] Assignee: Dresser Industries, Inc., Dallas, Tex.

[21] Appl. No.: 08/915,956

[22] Filed: Aug. 21, 1997

[51] Int. Cl.[6] .......................... B01D 37/00; B01D 35/02
[52] U.S. Cl. ...................... 210/767; 210/416.4; 210/470; 210/497.01; 210/497.3; 210/499; 210/474; 210/477; 210/443; 210/448; 210/451
[58] Field of Search ............................ 210/497.01, 497.3, 210/499, 474, 767, 477, 416.4, 470, 435, 443, 448, 451

[56] References Cited

U.S. PATENT DOCUMENTS

| | | | |
|---|---|---|---|
| 284,428 | 9/1883 | James | 210/497.01 |
| 321,877 | 7/1885 | Abell | 210/474 |
| 356,555 | 1/1887 | Ryan | 210/474 |
| 414,240 | 11/1889 | Norton . | |
| 526,637 | 9/1894 | Ryan | 210/474 |
| 605,500 | 6/1898 | Morrison . | |
| 622,217 | 4/1899 | Fuller et al. . | |
| 680,779 | 8/1901 | King | 210/474 |
| 748,230 | 12/1903 | Stout . | |
| 807,286 | 12/1905 | King | 210/474 |
| 911,388 | 2/1909 | Franke . | |
| 1,193,970 | 8/1916 | Bacher . | |
| 1,484,767 | 2/1924 | Fell . | |
| 1,547,855 | 7/1925 | Burson | 210/474 |
| 1,573,929 | 2/1926 | Gall . | |
| 1,780,774 | 11/1930 | White | 210/497.01 |
| 2,019,094 | 10/1935 | Rice et al. . | |
| 2,028,520 | 1/1936 | Phillips . | |
| 2,068,837 | 1/1937 | Aronson . | |
| 2,247,040 | 6/1941 | Whitsett . | |
| 2,354,008 | 7/1944 | Grey | 210/497.01 |
| 2,761,529 | 9/1956 | Wisenbaugh . | |
| 2,865,511 | 12/1958 | Hopkins, Jr. . | |
| 3,322,282 | 5/1967 | Lyman . | |
| 4,419,240 | 12/1983 | Rosaen . | |
| 5,092,999 | 3/1992 | Valenzuela et al. . | |
| 5,122,264 | 6/1992 | Mohr et al. . | |
| 5,393,548 | 2/1995 | Heiligman . | |
| 5,624,559 | 4/1997 | Levin et al. . | |

*Primary Examiner*—Robert J. Popovics
*Attorney, Agent, or Firm*—Haynes & Boone, LLP

[57] ABSTRACT

A strainer formed by a body member defining an inlet passage for receiving the fluid and an outlet passage for discharging the fluid. A chamber is connected to the outlet passage and an internal passage connects the inlet passage to the chamber. A separator is disposed in the chamber for separating particles from the fluid as the fluid passes through the chamber. The fluid is thus routed into the inlet passage, and through the inlet passage to the chamber where the particles are separated. The fluid is then passed to the discharge passage for discharging the fluid to a conduit.

7 Claims, 1 Drawing Sheet

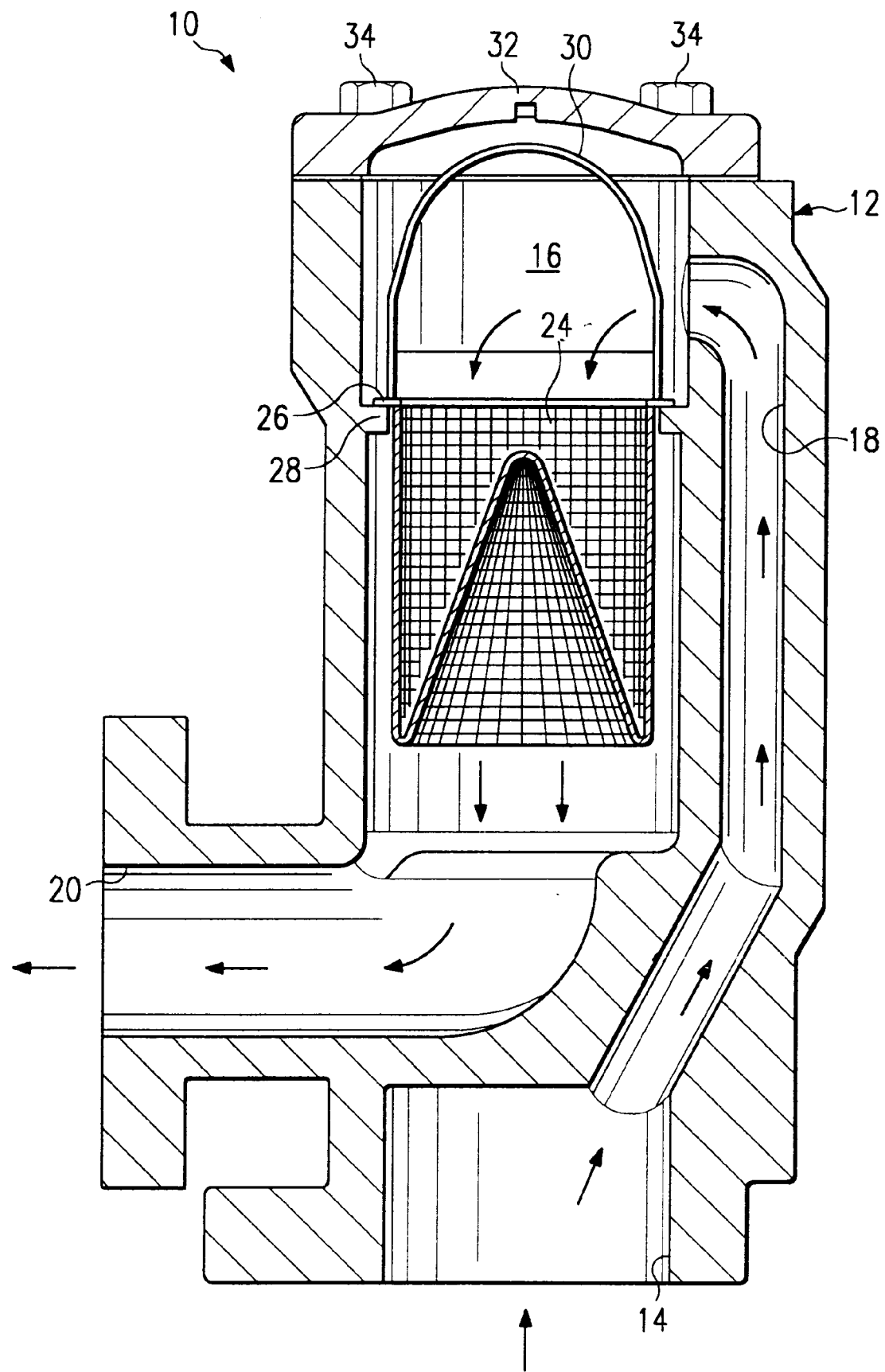

STRAINER AND METHOD FOR SEPARATING SOLID PARTICLES FROM A LIQUID

BACKGROUND OF THE INVENTION

The present invention relates to a strainer and method for separating solid particles from a liquid, and, more particularly, to such a strainer that is adapted to be placed in a fluid flow line. Many types of strainers are available including those that are placed in a fluid flow line for separating particles from fluid as it flows though the flow line. However, these strainers suffer from one or more problems. For example, in some designs the separated particles are prone to drop back into the inlet pipe for the strainer especially when the fluid flow is terminated. In other designs, it is difficult to avoid fluid spillage when the strainer is accessed for the purpose of cleaning, etc. These problems are especially acute when the strainer is used in a gasoline dispensing installation in a service station, since it is critically important in this environment that the flows lines not be clogged and spillage of the gasoline be prevented, so that a hazardous situation is avoided.

Therefore, what is needed is a strainer for a fluid flow system which prevents the separated particles in the strainer from dropping back into the inlet pipe for the strainer when the fluid flow has been terminated. Also needed is a strainer of the above type in which spillage is avoided when the strainer is accessed.

SUMMARY OF THE INVENTION

The present invention, accordingly, provides a strainer formed by a body member defining an inlet passage for receiving the fluid and an outlet passage for discharging the fluid. A chamber is connected to the outlet passage and an internal passage connects the inlet passage to the chamber. A separator is disposed in the chamber for separating particles from the fluid as the fluid passes through the chamber.

Thus, a major advantage is achieved with the system and method of the present invention since the separated particles in the strainer are prevented from dropping back into the inlet pipe for the strainer when the fluid flow has been terminated. Also, the strainer and method of the present invention eliminate spillage of the fluid when the strainer is accessed.

BRIEF DESCRIPTION OF THE DRAWINGS

The drawing is a front elevational view of the strainer of the present invention.

DESCRIPTION OF THE PREFERRED EMBODIMENT

Referring to the drawing, the reference numeral 10 refers in general, to the strainer of the present invention which is formed by a hollow body member 12 fabricated of a rigid material such as metal or plastic, and having an inlet passage 14 for receiving fluid containing dispersed particles. An elongated chamber 16 is formed in the body member 12 and an internal passage 18 extends through the body member from the inlet passage 14 to the upper portion of the chamber, as viewed in the drawing. The passage 18 is laterally spaced from the chamber 16 with their respective axes extending parallel. The ends of the passage 18 register with the inlet passage 14 and the chamber 16 for reasons to be described. An outlet passage 20 extends perpendicular to the inlet passage 14 and communicates with the lower portion of the chamber 16.

It is understand that the body member 12 is connected to a source of fluid in any conventional manner so that the fluid is introduced into the inlet passage 14, and that the fluid may have particles, such a sediment, or the like, dispersed therein. It is also understood that a conduit, a pipe, of the like is connected to the body member 12 in registry with the outlet passage for receiving the fluid after it has passed through the body member in a manner to be described. As an example of the foregoing, the fluid is a gasoline and the strainer 10 is connected in the flow line for the gasoline extending from an underground storage tank to a dispensing station in a service station. In these applications, the gasoline often contains particles, such as sediment, etc. which must be separated from the gasoline before it is introduced into a vehicle.

A separator, in the form of a cylindrical basket 24, extends in the lower portion of the chamber 16 with a slight clearance between the outer surface of the basket and that portion of the body member 12 defining the chamber. The upper end of the basket 24 is open and a circular flange 26 extends from the outer surface of the upper end and rests on a flange 28 of the body member that extends into the chamber 16, to suspend the basket 24 in the chamber 16.

The lower end, or floor, of the basket 24 is conical shaped with the height of the cone extending for a substantial portion of the height of the basket. The basket 24 is formed of a mesh-like material which is designed to pass fluids but retain particles over a predetermined size. This material can vary according to the particular application in order to vary the size of the particles that can be captured.

A U-shaped handle 30 extends from the upper portion of the basket 24 with its ends being affixed to the flange 26 in any known manner. A cover, or dome, 32 extends over the upper end of the body member 12 and is internally shaped so as to receive the upper end portion of the handle 30. A pair of bolts 34 extend through corresponding openings in the cover 32 and the upper end of the body member 12 to secure the former to the latter.

In operation, pressurized fluid from an external source is introduced into the inlet passage 14 of the body member 12 and flows into and upwardly through the passage 18 before entering the upper portion of the chamber 16. The fluid then flows downwardly through the interior of the basket 24, and through the conical-shaped portion thereof before exiting the lower end of the chamber. The fluid then enters the outlet passage 20 through which it flows before exiting the body member 12 and passing to the aforementioned conduit or pipe. During this flow of the fluid through the basket 24 in the foregoing manner, any particles of a predetermined size that are dispersed in the fluid will be trapped on the interior surface of the basket, including the conical-shaped portion thereof, thus separating these particles from the fluid.

The device and method of the present invention enjoy several advantages. For example, due to the provision and arrangement of the passage 18, when the fluid flow through the strainer 10 is terminated, the separated particles in the basket 24 cannot drop back into the inlet passage 14 or into any conduit connected to the inlet passage. Also, when the basket 24 has to be removed from the chamber 16, the cover 32 is removed, permitting the handle 30 to be grasped and be pulled upwardly, as viewed in the drawing. This permits removal of the basket 24 without spilling any fluid that may have accumulated therein. Further, the conical shaped portion of the basket 24 provides a relatively large surface area for capturing the particles in the fluid as the latter flows through the basket.

It is understood that variations may be made in the foregoing without departing from the scope of the present invention. For example, the specific arrangement and location of the inlet passage 14 and the outlet passage 20 can vary as long as the above objects, features and advantages of the strainer 10 are not compromised. Also the basket can be replaced by any other type of separator, filter or the like, as long as particles are separated from the fluid as the latter passes through the chamber.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A strainer for separating particles from fluid, the strainer comprising a body member, a chamber formed in the body member and having a vertically-extending axis, an inlet passage formed in the body member and having a first portion extending substantially vertical and parallel to the axis of the chamber and a second portion connecting an upper end of the first passage portion to an upper end of the chamber, the lower end of the first passage portion receiving the fluid and the second passage portion receiving the fluid from the first passage portion and discharging the fluid into the upper portion of the chamber, wherein the fluid enters the lower end of the body member at the lower end of the passage, passes upwardly through the passage, discharges into the upper portion of the chamber, and passes downwardly through the chamber, a cylindrical basket disposed in the chamber and formed of a filtration material which passes the fluid and retains particles over a predetermined size, the floor of the basket being conical-shaped with the height of the cone extending for a substantial portion of the height of the basket, and a discharge passage formed in the body member, communicating with the lower portion of the chamber, and extending at an angle to the axis of the chamber, the discharge passage receiving the fluid from the basket and discharging it from the body member.

2. The strainer of claim 1 wherein the angle is approximately ninety degrees.

3. The strainer of claim 1 wherein the inlet passage and the chamber extend for substantially the entire length of the body member.

4. The strainer of claim 1 further comprising a handle formed on the basket and a cover extending over the body member and adapted to receive the handle.

5. A method of separating particles from a fluid flowing through a conduit comprising the steps of introducing the fluid into the lower end of a vertically-extending inlet passage, passing the fluid upwardly through the inlet passage and then discharging the fluid into an upper end of a chamber having an axis extending parallel to the axis of the passage, allowing the fluid to flow downwardly through the chamber, disposing a conical-shaped filtration material in the chamber which passes the fluid and retains particles over a predetermined size to separate the particles from the fluid as the fluid flows downwardly through the chamber, and discharging the separated fluid from the chamber at an angle to the direction of the fluid flow through the chamber.

6. The method of claim 5 wherein the angle is approximately ninety degrees.

7. The method of claim 5 wherein the fluid passes from the inlet passage, through an angularly-extending passage connecting the inlet passage to the chamber, and into the chamber.

* * * * *